US00RE36994E

United States Patent [19]

Anderberg

[11] E Patent Number: Re. 36,994

[45] **Reissued Date of Patent: *Dec. 19, 2000**

[54] RECTAL PLUG AND METHOD OF INTRODUCING SAME INTO A SLAUGHTERED ANIMAL

[75] Inventor: Steven L. Anderberg, Cottage Grove, Minn.

[73] Assignee: StarchTech, Inc., Golden Valley, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,415

[22] Filed: Apr. 7, 1997

Related U.S. Patent Documents

Reissue of:

[64] Patent No.: 5,494,481
Issued: Feb. 27, 1996
Appl. No.: 08/452,005
Filed: May 26, 1995

[51] Int. Cl.[7] ..... A22B 5/00; A22C 21/00

[52] U.S. Cl. ..... 452/176; 452/120; 606/197

[58] Field of Search ..... 452/176, 120, 452/109; 128/401, DIG. 25; 606/197

[56] References Cited

U.S. PATENT DOCUMENTS

| | | | |
|---|---|---|---|
| 3,881,485 | 5/1975 | Davis, Jr. | 128/270 |
| 3,943,938 | 3/1976 | Wexler et al. | 128/421 |
| 4,057,535 | 11/1977 | Lipatova et al. | 260/77.5 AC |
| 4,465,702 | 8/1984 | Eastman et al. . | |
| 4,723,952 | 2/1988 | Esposito | 604/277 |
| 4,924,551 | 5/1990 | Greenbank et al. | 452/120 |
| 5,083,975 | 1/1992 | Neal et al. | 452/176 |
| 5,114,380 | 5/1992 | Larsen | 452/176 |
| 5,120,266 | 6/1992 | Aubert | 452/176 |
| 5,120,267 | 6/1992 | Neal et al. | 452/176 |
| 5,155,140 | 10/1992 | Marten et al. | 523/100 |
| 5,338,560 | 8/1994 | Wesdorp et al. | 426/573 |
| 5,474,492 | 12/1995 | Aubert . | |
| 5,588,905 | 12/1996 | Nightingale . | |

FOREIGN PATENT DOCUMENTS

WO 94/15471 7/1994 WIPO .

*Primary Examiner*—Willis Little
*Attorney, Agent, or Firm*—Nikolai, Mersereau & Dietz, P.A.

[57] ABSTRACT

Fecal leakage and contamination from the vent opening of an animal carcass during slaughtering and processing is eliminated by injecting a highly viscous material comprising a mixture of food grade constituents through the vent opening so as to create a self-adhering plug in the lower colon and rectum of the animal. The plug material preferably comprises a blended mixture of water, gum, modified food starch and a preservative whose viscosity is in the range of from about 220,000 centipoise to 480,000 centipoise. Being formed from food grade constituents, the offal can safely be harvested and used in animal feed as a by-product of the meat processing operation.

11 Claims, No Drawings

RECTAL PLUG AND METHOD OF INTRODUCING SAME INTO A SLAUGHTERED ANIMAL

Matter enclosed in heavy brackets [ ] appears in the original patent but forms no part of this reissue specification; matter printed in italics indicates the additions made by reissue.

BACKGROUND OF THE INVENTION

I. Field of the Invention

This invention relates generally to meat and poultry processing, and more particularly to a material, method and apparatus for inhibiting fecal contamination of the meat during slaughter and evisceration of animals whose meat is intended for human consumption.

II. Discussion of the Prior Art

A prime concern in the processing of meat animals is preventing fecal material which is present in the animal's rectum and intestines at the time of slaughter from leaking onto the carcass and causing contamination. Such contamination can result in the failure of the slaughtered animal to meet U.S. Department of Agriculture (USDA) health inspection standards. Areas of the animal subjected to fecal contamination must be excised and discarded, resulting in a financial loss to the processor and to the grower.

In a typical poultry processing line, the birds have their throats cut and are mounted head down on a moving chain conveyor as the blood is allowed to drain. Next, the birds are placed in scalding water to loosen the feathers and then are run through a mechanical feather picking machine. Subsequently, the birds are eviscerated. Fecal contamination can result during the defeathering and evisceration steps due to compressive forces to which the animals are subjected, such as by the defeathering machine. These compressive forces may squeeze the intestines, thereby forcing fecal matter out through the anal opening.

In the Neal et al. Pat. U.S. 5,083,975, there is described a method for addressing the problem of fecal matter leakage from an animal carcass during slaughtering and processing thereof. In accordance with the Neal '975 patent, Krazy-Glue® cyanoacrylate adhesive is applied to the vent opening or anus of the animal carcass. The adhesive bonds the tissue of the vent together so as to seal the opening. While the method described in that prior art patent proved effective for preventing leakage of fecal matter, because cyanoacrylate adhesive is considered toxic, the offal could not be approved for use in dog food or the like.

SUMMARY OF THE INVENTION

In accordance with the present invention, immediately after the animal is killed and suspended from a moving chain conveyor, a measured quantity, which varies depending on animal size, of a highly viscous food grade material is injected into the anus or cloacal vent of the animal which acts as a rectal plug, preventing outflow of fecal matter. Testing results show the accidental cutting by workers on the enviscerating line as the entrails are removed, thus eliminating the deposit of fecal matter on the animal which can result in condemnation by federal inspectors. The plug material is a formulation of food grade substances including a thermally stable gum, a modified food starch or other thickener and a preservative that prevents degradation of the plug material prior to use. The apparatus used to inject the plug material may comprise a piston pump, a peristalic roller pump or other type of device capable of extruding a measured quantity of the plug material on each actuation thereof sufficient to effect sealing of the anal opening or vent, but without causing rupture of the large intestine. A compressed air operated gun having a tip insertable into the anal opening or vent of the animal and designed to inject a predetermined volume of plug material upon each actuation may also be used.

Without limitation, the gum ingredient may comprise galactomannan gums including locust bean gum and guar gum, gum karaya, gum tragacanth, xanthan gum. The modified food starch ingredient may comprise one or more of starches derived from arrowroot, bean, buckwheat, corn, pea, potato, rice, rye, tapioca waxy barley and waxy maize. A variety of preservatives (antimicrobial agents) are also available for use in formulating the plug material in accordance with the present invention. The gum, starch and preservative ingredients will be combined with water such that the resulting product preferably has a viscosity in the range of from 220,000 to 480,000 centipoise.

The plug material of the present invention is safe for use in animal feeds which may be made from by-product (offal) of meat animals.

A further advantage of the invention is that it does not appreciably lose its viscosity when heated, and, thus, it can withstand the poultry scalding stage used in loosening feathers without losing its effectiveness as a vent seal.

DESCRIPTION OF THE PREFERRED EMBODIMENT

The present invention comprises a rectal plug formed as a blend of viscous food grade material along with a method of injecting the material into the rectum of slaughtered animals to prevent fecal contamination during processing. While the material of the present invention is well suited for use in processing poultry, especially chickens and turkeys, it is also suitable for use in processing other meat animals, including hogs and cattle.

The food grade rectal plug material contains a mixture of water, one or more gums selected for their viscosity and thermal properties, modified food starch as a thickener and a suitable preservative.

With no limitation intended, appropriate gums may be selected from agar, carrageenan, and galactomannan gums, such as locust bean gum and guar gums. Guar gum, itself, is non-gelling and may be used as a viscosity builder and water binder. Guar gum interacts synergistically with xanthan gum, affording an increase in solution viscosity. Alternative gums may be selected from the class referred to as exudate gums with gum tragacanth being preferred because of its high viscosity property and its stability to heat.

As mentioned, other ingredients used in formulating the rectal plug material include modified food starches and preservatives. Suitable candidates for each are as follows:

Modified Food Starches
Arrowroot
Bean
Buckwheat
Corn
Pea
Potato
Rice
Rye
Tapioca
Waxy Barley
Waxy Maize Wheat
Combinations of the Above
Preservatives (Antimicrobial Agents)
Acetic Acid
Adipic Acid
Benzoates
Benzoic Acid
Citric Acid
Coaguable Meat Proteins
Dehydroacetic Acid and its sodium salt
Fumaric Acid
Glucono Delta Lactone
Lactic Acid
Liquid Smoke
Malic Acid
Natamycin
Nicin
Nitrites (can affect meat color; use not as likely)
O-Phenylphenate, Sodium Salt, Tetra hydrate
Parabens
Parahydroxy-Benzoic Acid
Phosphoric Acid
Potassium Benzoate
Potassium Sorbate
Propionates
Propionic Acid
Sodium Lacetate
Sodium Diacetate
Sorbates
Sorbic Acid
Succinic Acid
Tannic Acid
Tartaric Acid
Vinegar It may also be found expedient to include other thickeners in the formulation to achieve the desired viscosity for the material. They may include any one or more of the following in combination.

Other Thickeners
Amaranth Flour
Carboxymethyl Cellulose
Cottonseed Proteins
Dairy Proteins
Egg Proteins
Heat coagulable meat proteins
Microcrystalline Cellulose
Milo Flour
Mustard Flour
Oat flour
Peanut Flour
Pectin
Protein Hydrolysates
Soy Proteins
Triticale Flour

EXAMPLE I

A mixture comprising 2% by volume of guar gum and 1% xanthan gum, 15% modified food starch (wheat starch) and 0.5% propylparaben and the balance water was well blended. The end product was found to have a viscosity in excess of 220,000 centipoise. Four to six grams of the product was injected through a nozzle into the vents of 200 turkeys. After bleeding and prior to scalding, defeathering and evisceration thereof. The rectal plug was found to preclude exudation of fecal matter out through the vent during the processing operations.

EXAMPLE II

A mixture comprising 7% by volume of guar gum, 25% modified food starch (potato starch), 3.5% of propylparaben as a preservative and the balance water exhibited a viscosity of about 480,000 centipoise. The mixture was placed in a storage container and then later pumped using a piston pump. A tapered nozzle attached to the end of the line was inserted into the anus and rectum of the animal and seated. Four to six grams of the product were injected, the amount being sufficient to permit the plug material to penetrate part way into the colon. When the nozzle was withdrawn, the viscous rectal plug material was found to cling to the inner walls of the intestine and rectum to form a complete seal and no traces of fecal matter were found to leak past the seal so as to contaminate the carcass. Even under the heavy impacting forces to which the carcass is subjected by the feather picking equipment, because the plug material is injected well into the colon, no leakage results as may be the case with a surface seal of the type achieved using the method of the Neal '975 patent where tearing of the tissue proximate the vent may destroy its integrity.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A [compositions for sealing a body orifice of an animal, said] composition comprising a blended mixture [of] *including* water, gum, [modified] food starch and a preservative, the mixture exhibiting a viscosity such that when a predetermined volume thereof is injected into [the animal's body orifice said volume of mixture] *a body orifice of an animal it* will seal said orifice.

2. The composition as in claim 1 wherein the gum is selected from the group consisting of guar gum, locust bean gum, gum karaya, gum tragacanth, xanthan gum, carrageenan and mixtures thereof.

3. The composition as in claim 1 wherein the [modified] food starch is selected from the group consisting of arrowroot, bean, buckwheat, corn, pea, potato rice, rye, tapioca, waxy barley, waxy maize, wheat and mixtures thereof.

4. The composition as in claim 1 wherein the preservative is selected from the group consisting of acetic acid, adipic acid, benzoates, benzoic acid, citric acid, dehydroacetic acid and its sodium salts, fumaric acid, glucono delta lactone (GDL), lactic acid, liquid smoke, malic acid, natamycin, nicin, O-phenylphenate, parabens, parahydroxy-benzoic acid, phosphoric acid, potassium benzoate, potassium sorbate, propionates, propionic acid, sodium lactate, sodium diacetate, sorbates, sorbic acid, succinic acid, tannic acid, tartaric acid, vinegar and combinations thereof.

5. The composition as in claim 1 and further including a thickening agent selected from the group consisting of amaranth flour, carboxymethyl cellulose, cottonseed proteins, dairy proteins, micro crystalline cellulose, egg proteins, heat coagulable meat proteins, milo flour, mustard flour, oat flour, peanut flour, pectin, protein hydrolysates, soy proteins, triticale flour and combinations thereof.

[6. The composition as in any one of claims 1–5 wherein said viscosity is in the range of from 220,000 centipoise to 480,000 centipoise.]

7. A method for preventing fecal contamination of the carcass during the processing thereof, the improvement comprising:

injecting an effective amount of a blended mixture of food grade materials [whose viscosity is in the range of from about 220,000 centipoise to about 480,000 centipoise] *of a sufficient viscosity* into the anal opening of the animal following the killing thereof so as to create a plug in the colon blocking egress of fecal matter out through the anal opening.

8. The method as in claim 7 wherein the mixture is thermally stable blend of water, gum, a [modified] starch and a preservative.

9. The method as in claim 8 wherein the mixture includes percentages, 3–7% by volume of gum, 13–25% of modified food starch, 0.5–3.5 percent propylparaben and the balance water.

10. The method as in claim 8 wherein the gum is selected from the group consisting of guar gum, locust bean gum, gum karaya, gum tragacanth, xanthan gum, carrageenan and mixtures thereof.

11. The method as in claim 8 wherein the [modified] food starch is selected from the group consisting of arrowroot, bean, buckwheat, corn, pea, potato, rice, rye, tapioca, waxy barley, waxy maize, wheat and mixtures thereof.

12. The method as in claim 8 wherein the preservative is selected from the group consisting of acetic acid, adipic acid, benzoates, benzoic acid, citric acid, dehydroacetic acid and its sodium salts, fumaric acid, glucono delta lactone (GDL), lactic acid, liquid smoke, malic acid, natamycin, nicin, nitrites, O-phenyl phenate, parabens, parahydroxybenzoic acid, phosphoric acid, potassium benzoate, potassium sorbate, propionates, propionic acid, sodium lactate, sodium diacetate, sorbates, sorbic acid, succinic acid, tannic acid, tartaric acid, vinegar and combinations thereof.

* * * * *